A. J. NEWTON.
CHAIN TIGHTENER AND LOCK.
APPLICATION FILED SEPT. 21, 1912.
1,068,524.
Patented July 29, 1913.
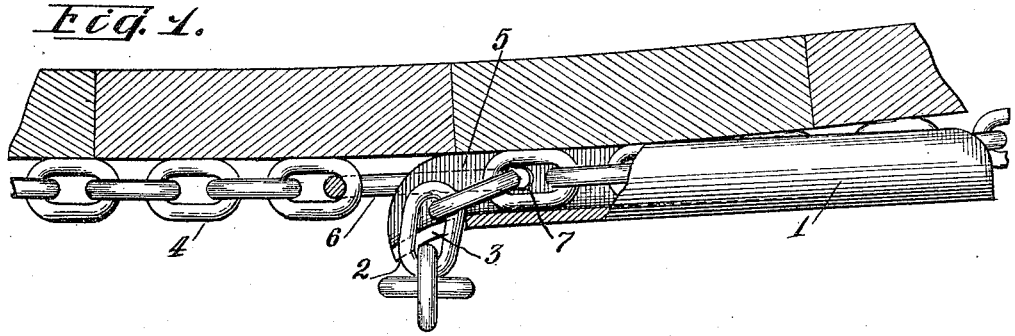
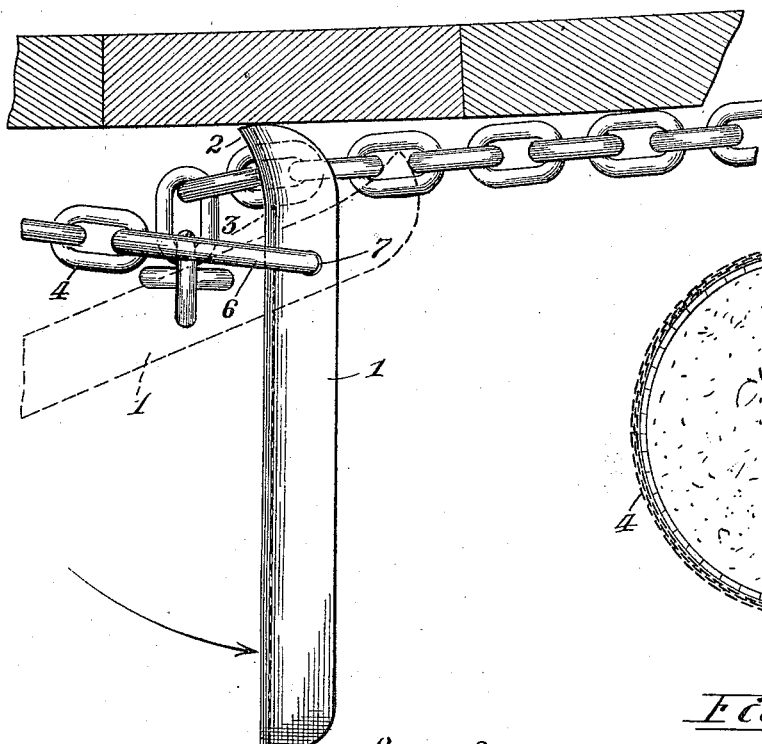
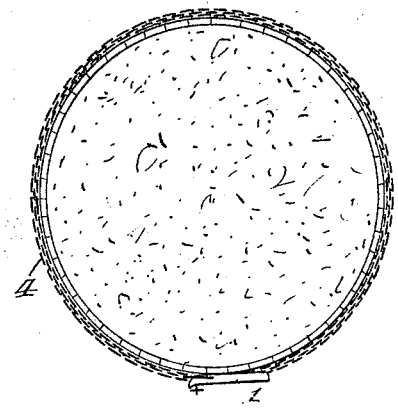
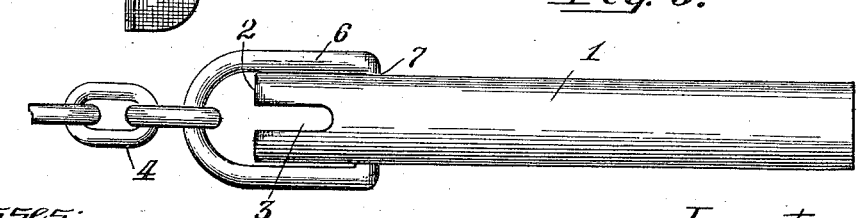
Witnesses:
Inventor:
Arthur J. Newton

UNITED STATES PATENT OFFICE.

ARTHUR J. NEWTON, OF CHICAGO, ILLINOIS.

CHAIN TIGHTENER AND LOCK.

1,068,524.  Specification of Letters Patent.  Patented July 29, 1913.

Application filed September 21, 1912. Serial No. 721,688.

*To all whom it may concern:*

Be it known that I, ARTHUR J. NEWTON, a citizen of the United States, residing at Chicago, in the county of Cook and State of Illinois, have invented certain new and useful Improvements in Chain Tighteners and Locks; and I do hereby declare the following to be a full, clear, and exact description of the invention, such as will enable others skilled in the art to which it appertains to make and use the same.

This invention has for its object to provide a simple and efficient device for tightening chains passed around concrete molds and the like, and holding the same taut after having taken up the slack.

The invention consists in the features of construction and combinations of parts hereinafter fully described and particularly claimed.

In the accompanying drawings illustrating the invention: Figure —1— is a fragmentary detail plan section of a concrete mold, or the like, showing the respective ends of the chain passed around the same and the connection thereof with the tightening and locking device constructed in accordance with my invention. Fig. —2— is a view similar to Fig. —1— showing the device in the position in which the slack in the chain is being taken up. Fig. —3— is a detail view in front elevation of the tightening and locking device embodying my invention. Fig. —4— is a diagrammatic view of a mold having a chain disposed around the same which is tightened and locked by means of my device.

My said device comprises the lever 1 consisting of a substantially semi-cylindrical strip of metal having an upturned lip 2 at one end, the latter being bifurcated by means of a recess 3 in which a link of the chain 4 is adapted to be received. Pivotally secured to the flanges 5 of said member 1 contiguous to the upturned lip 2 thereof is a link 6 which is U-shaped and provided at the free end of its arms with inwardly projecting lugs 7 which enter perforations in said flanges 5, rearwardly of the bifurcated end portion. One end of the chain 4 is secured to said link, the other end thereof being free and adapted to be passed around the mold or other device to be confined within the chain. The said link 6 is of such length that it projects beyond the bifurcated end portion of the latter. In use the other or free end of the chain after being passed around the object, such as a mold, lumber pile or the like, is passed through the said link 6, the lever 1 being at that time disposed in the position indicated in dotted lines in Fig. —2—. One of the links of the chain 4 is then passed into the recess 3 in the bifurcated end portion 2 of said member 1 and by then turning the same in the direction of the arrow, shown in Fig. —2—, the said end portion of the chain engaged in the nose portion of said lever 1 and the end thereof engaged with the link 6 will be drawn toward each other thus taking up the slack in the chain. The movement of the lever in the direction of the arrow is continued until said member 1 is brought into the position shown in Fig. —1—. In completing the movement of the lever 1 until it has attained the position shown in Fig. —1— the portion of the chain lying within the flanges 5 of said member 1 will be thrown past the axis of tension of the other end portion of the chain, or in other words, past the line of dead center, as it is commonly called, and thereupon the said lever 1 will retain the position shown in Fig. —1— to prevent release of the chain from engagement therewith or from becoming slack.

The device is very simple and efficient.

I claim as my invention:

1. The combination with a chain, of a lever having a longitudinal groove in which the chain is adapted to be received, a link pivotally secured to said lever adjacent one end thereof, said chain secured at one end to said link and adapted to pass around an object and pass at its other end through said link, there being a recess in the end of said lever contiguous to said link in which a link of the chain is adapted to be received, said lever adapted to be turned on said pivotal connection with said link as a pivot for drawing the ends of said chain toward each other as said lever turns in a direction to receive the chain in the longitudinal groove therein, said end portion of said chain engaged by said lever adapted as said lever is turned in said direction to be thrown past the pivotal axis of said link, the tension imparted to said chain by said lever, as the last-named movement thereof is completed, resisting reverse movement thereof, substantially as and for the purpose specified.

2. The combination with a chain adapted to be passed around an object, of concavo-convex lever having one end portion bent to project outwardly from the convex face thereof, said end portion bifurcated, and a link pivotally secured to the side portions of said lever contiguous to and inwardly of said bifurcated end portion thereof, said chain secured at one end to said link and the other end portion thereof adapted to pass through said link and be engaged by said bifurcated end portion for drawing the ends of the chain toward each other, the portion of the chain contiguous to the part engaged in said bifurcated end portion adapted to enter the concave side of said lever as the latter is turned in the direction to take up slack in said chain, said end portion of said chain engaged in the bifurcated end of said lever adapted, as the latter is turned in said direction, to be thrown past the pivotal axis of said link and the tension imparted to said chain by said lever as the last-named movement thereof is completed, resisting reverse movement of said lever, substantially as and for the purpose specified.

In testimony whereof I have signed my name in presence of two subscribing witnesses.

ARTHUR J. NEWTON.

Witnesses:
 R. W. LOTZ,
 B. NEWTON.

---

Copies of this patent may be obtained for five cents each, by addressing the "Commissioner of Patents, Washington, D. C."